United States Patent
Lee

(10) Patent No.: US 11,538,253 B2
(45) Date of Patent: Dec. 27, 2022

(54) APPARATUS AND METHOD FOR COMPENSATING FOR ERROR OF VEHICLE SENSOR

(71) Applicants: Hyundai Motor Company, Seoul (KR); Kia Motors Corporation, Seoul (KR)

(72) Inventor: Wooyoung Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 487 days.

(21) Appl. No.: 16/834,425

(22) Filed: Mar. 30, 2020

(65) Prior Publication Data

US 2021/0182578 A1 Jun. 17, 2021

(30) Foreign Application Priority Data

Dec. 16, 2019 (KR) .......................... 10-2019-0167577

(51) Int. Cl.
*G06V 20/58* (2022.01)
*G06F 17/16* (2006.01)
*B60W 30/08* (2012.01)
*G06K 9/62* (2022.01)

(52) U.S. Cl.
CPC .............. *G06V 20/58* (2022.01); *B60W 30/08* (2013.01); *G06F 17/16* (2013.01); *G06K 9/6288* (2013.01)

(58) Field of Classification Search
CPC ........ G06V 20/58; B60W 30/08; G06F 17/16; G06K 9/6288
See application file for complete search history.

(56) References Cited

U.S. PATENT DOCUMENTS

2014/0098229 A1* 4/2014 Lu .......................... H04N 7/181
348/148

FOREIGN PATENT DOCUMENTS

WO WO-2021050646 A1 * 3/2021 ............ B25J 9/1697

OTHER PUBLICATIONS

Guo, Longxiang, et al. "Automatic sensor correction of autonomous vehicles by human-vehicle teaching-and-learning." IEEE transactions on vehicular technology 67.9 (2018): 8085-8099. (Year: 2018).*

(Continued)

*Primary Examiner* — Fayyaz Alam
(74) *Attorney, Agent, or Firm* — Fox Rothschild LLP

(57) ABSTRACT

An apparatus and method for compensating for an error of a vehicle sensor for enhancing performance for identifying the same object are provided. The apparatus includes a rotation angle error calculator that calculates a rotation angle error between sensor object information and sensor fusion object information. A position error calculator calculates a longitudinal and lateral position error between the sensor object information and the sensor fusion object information. A sensor error compensator calculates a sensor error based on the calculated rotation angle and a position error. In calculating the rotation angle error, the sensor error compensator corrects an error of the sensor object information based on the rotation angle error, and compensates for the sensor error based on the longitudinal and lateral position error between the corrected sensor object information and the sensor fusion object information.

20 Claims, 9 Drawing Sheets

(56) References Cited

OTHER PUBLICATIONS

Sivaraman, Sayanan, and Mohan Manubhai Trivedi. "Integrated lane and vehicle detection, localization, and tracking: A synergistic approach." IEEE Transactions on Intelligent Transportation Systems 14.2 (2013): 906-917. (Year: 2013).*

Du, Jie, and Matthew J. Barth. "Next-generation automated vehicle location systems: Positioning at the lane level." IEEE Transactions on Intelligent Transportation Systems 9.1 (2008): 48-57. (Year: 2008).*

* cited by examiner

APPARATUS AND METHOD FOR COMPENSATING FOR ERROR OF VEHICLE SENSOR

CROSS-REFERENCE TO RELATED APPLICATION(S)

This application claims the benefit of Korean Patent Application No. 10-2019-0167577, filed on Dec. 16, 2019, which is hereby incorporated by reference as if fully set forth herein.

BACKGROUND

Field of the Invention

The present disclosure relates to a vehicle sensor error compensation apparatus, and more particularly, to an apparatus and method for compensating for an error of a vehicle sensor for enhancing performance for identifying the same object.

Discussion of the Related Art

In general, one technological development of autonomous driving and advanced driver assistance systems (ADAS) of a vehicle is a technology for acquiring accurate and reliable information regarding a surrounding environment. Various methods have been developed to acquire surrounding environment information with high reliability, including an information fusion method between heterogeneous sensors.

The information fusion method between heterogeneous sensors requires a previously performance of an operation of correcting coordinates of the heterogeneous sensors to the same reference coordinate. However, despite the operation of correction to the same reference coordinate, it is difficult to perform the operation of correcting coordinates of the heterogeneous sensors to the same reference coordinate due to sensor noise, deformation of a sensor mount because of time or heat, a tough driving environment of a vehicle, or the like.

Mismatch in coordinates of the heterogeneous sensors may cause position errors with respect to a surrounding object. For example, an error of about 1 degree may cause a position error of about 0.17 m with respect to an object at a distance of 10 m, but may cause a position error of about 1.7 m with respect to an object at a distance of about 100 m.

A position error of objects due to mismatch of coordinates may also adversely affect performance for identifying the same object. With regard to the method of identifying the same object, when detection objects are present at a position of a predicted track or within a predetermined radius from the surrounding of an object detected by a reference sensor, the objects may be determined to be the same, and in this regard, a single object present at a long distance may be identified as if various objects are present due to a position error with respect to an object at a long distance.

Such degradation in performance for identifying the same object with respect to an object at a long distance may cause a malfunction in urgent collision avoidance, lane change, or the like during rapid autonomous driving. In particular, a single object may be identified as if various objects are present at a long distance and thus it may not be possible to appropriately estimate a time point of collision avoidance and lane change. Accordingly, there is a need to develop a vehicle sensor error compensation apparatus for enhancing performance for identifying the same object through real-time correction to match coordinates between heterogeneous sensors.

SUMMARY

Accordingly, the present disclosure is directed to an apparatus and method for compensating for an error of a vehicle sensor for enhancing performance for identifying the same object via real-time correction to match coordinates of heterogeneous sensors by correcting a sensor error based on a rotation angle error between sensor object information and sensor fusion object information and a longitudinal/lateral position error.

The technical problems solved by the exemplary embodiments are not limited to the above technical problems and other technical problems which are not described herein will become apparent to those skilled in the art from the following description.

To achieve these objects and other advantages and in accordance with the purpose of the disclosure, as embodied and broadly described herein, a vehicle sensor error compensation apparatus may include a rotation angle error calculator configured to calculate a rotation angle error between sensor object information and sensor fusion object information, a position error calculator configured to calculate a longitudinal and lateral position error between the sensor object information and the sensor fusion object information, and a sensor error compensator configured to compensate for a sensor error based on the calculated rotation angle and position error. When calculating the rotation angle error, the sensor error compensator corrects an error of the sensor object information based on the rotation angle error, and compensates for the sensor error based on the longitudinal and lateral position error between the corrected sensor object information and the sensor fusion object information.

In another aspect of the present disclosure, a method of compensating for an error of a vehicle sensor of a vehicle sensor error compensation apparatus may include acquiring sensor object information and sensor fusion object information, calculating a rotation angle error between the sensor object information and the sensor fusion object information by projecting the sensor object information to the sensor fusion object information, correcting an error of the sensor object information based on the calculated rotation angle error, calculating a longitudinal and lateral position error between the corrected sensor object information and the sensor fusion object information, and compensating for the sensor error based on the position error and the rotation angle error.

In another aspect of the present disclosure, a non-transitory computer-readable recording medium having recorded thereon a program for executing the method of compensating for an error of a vehicle sensor vehicle compensation apparatus may perform procedures provided by the vehicle sensor error compensation method.

In another aspect of the present disclosure, a vehicle may include a sensing apparatus configured to sense sensor object information and sensor fusion object information regarding a target object, and a vehicle sensor error compensation apparatus configured to compensate for a sensor error based on the sensor object information and the sensor fusion object information. The vehicle sensor error compensation apparatus may include a rotation angle error calculator configured to calculate a rotation angle error between sensor object information and sensor fusion object information, a position error calculator configured to calculate a longitudinal and lateral position error between the sensor object information and the sensor fusion object information, and a sensor error compensator configured to correct an error of the sensor object information based on the rotation angle error, and to compensate for the sensor error based on the longitudinal and lateral position error between the corrected sensor object information and the sensor fusion object information.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
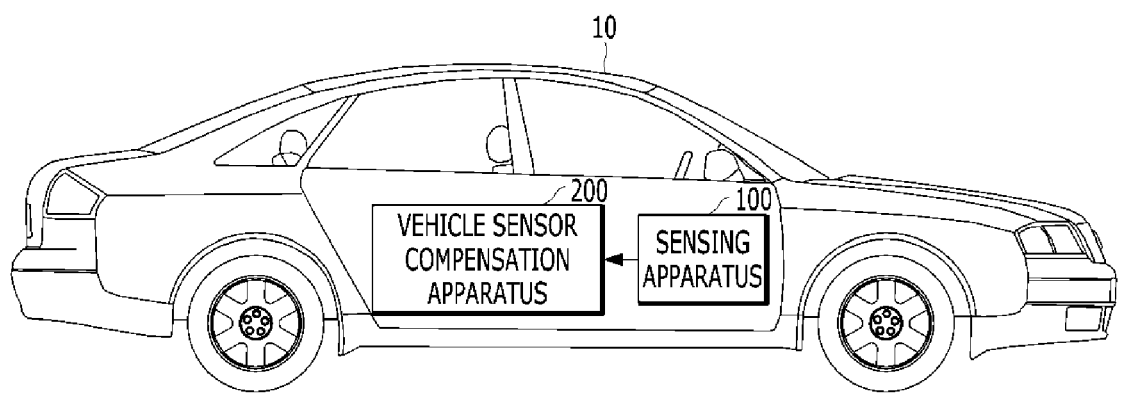
FIG. 1 is a diagram for explaining a vehicle to which a vehicle sensor error compensation apparatus according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

Hereinafter, an apparatus and method for compensating for compensating for an error of a vehicle sensor to which exemplary embodiments of the present disclosure are applicable will be described in detail with reference to FIGS. 1 to 10.

FIG. 1 is a diagram for explaining a vehicle 10 to which a vehicle sensor error compensation apparatus 200 according to the present disclosure is applied. As shown in FIG. 1, the vehicle 10 may include a sensing apparatus 100 configured to sense sensor object information regarding a target object and sensor fusion object information, and the vehicle sensor error compensation apparatus 200 configured to compensate for a sensor error based on the sensor object information and the sensor fusion object information. Notably, the various components of the apparatus described below may be operated by a controller.

Particularly, when acquiring sensor object information and sensor fusion object information from the sensing apparatus 100, the vehicle sensor error compensation apparatus 200 may be configured to calculate a rotation angle error between the sensor object information and the sensor fusion object information, correct an error of the sensor object information based on the calculated rotation angle error, calculate a longitudinal and lateral position error between the corrected sensor object information and the sensor fusion object information, and compensate for a sensor error based on the rotation angle and the position error.

When calculating the rotation angle error, the vehicle sensor error compensation apparatus 200 may be configured to calculate the rotation angle error between the sensor object information and the sensor fusion object information by projecting sensor fusion object information to sensor fusion object information. For example, when calculating the rotation angle error, the vehicle sensor error compensation apparatus 200 may be configured to calculate the rotation angle error between the sensor object information and the sensor fusion object information according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein, $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

In particular, the rotation angle error may be a yaw angle error of a sensor for sensing sensor object information. When the error of the sensor object information is corrected, the vehicle sensor error compensation apparatus 200 may be configured to calculate the longitudinal and lateral position error between the corrected sensor object information and the sensor fusion object information.

For example, when calculating the longitudinal and lateral position error, the vehicle sensor error compensation apparatus 200 may be configured to calculate the longitudinal and lateral position error between the sensor object information and the sensor fusion object information according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein, $x_{err}$ is a lateral position error, $y_{err}$ is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

In particular, the position error may be a longitudinal and lateral position error of a sensor for sensing the sensor object information. Accordingly, the vehicle sensor error compensation apparatus 200 according to the present disclosure may include a sensor position error model and a parameter estimator of the model. A position error model of each of the heterogeneous sensors may be present. The parameter of the sensor position error model may be derived using recursive least square (RLS) based on projection approach based on two types of information of sensor object information and sensor fusion object information (which is used as reference information).

According to the present disclosure, the reason for use of sensor fusion object position information as reference position information is as follows. First, sensor fusion generates more accurate and reliable information using information regarding heterogeneous sensors. Second, a position error due to slight mismatch of coordinates only with respect to an object at a short distance has a minimal influence to be within sensor resolution.

Accordingly, the sensor fusion object position information for an object at a short distance may be present within an allowable error for a result when sensors are matched to the same coordinate. In other words, according to the present disclosure, the most accurate and reliable reference position information may be acquired without use of a sensor such as real time kinematic-GPS (RTK-GPS).

The sensor position error model according to the present disclosure may be designed to have 6-degree of freedom of a sensor as a parameter by adjusting 6-degree of freedom of the sensor to match coordinates between heterogeneous sensors. The sensor position error model according to the present disclosure may be designed as a model having only main factors of parameters of 6-degree of freedom to reduce model complexity.

The sensor position error model according to the present disclosure may select main factors through analysis of influence of a position error for each factor of 6-degree of freedom. Thus, since a yaw angle error and a longitudinal and lateral position error of a sensor mount substantially affect identification of the same object in sensor function, the sensor position error model according to the present disclosure may be designed to have the yaw angle error and the longitudinal and lateral position error as a main factor.

In the sensor position error model, a yaw angle error and a longitudinal and lateral position error may substantially affect identification of the same object according to Equation:

$$\begin{bmatrix} x_{ref} \\ y_{ref} \end{bmatrix} = \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix} + \begin{bmatrix} x_{setupPos} \\ y_{setupPos} \end{bmatrix}$$

wherein, $[x_{ref}, y_{ref}]$ is an actual position of an object, $[x_{meas}, y_{meas}]$ is a position of an object, detected by a sensor, $\theta_{err}$ is a yaw angle error of a sensor, and $[x_{setupPos}, y_{setupPos}]$ is a longitudinal lateral error of a sensor.

According to the present disclosure, a model parameter may be estimated in real time. In other words, the model parameter according to the present disclosure may estimate sensor information input every hour and a sensor-fused track using projection approach and recursive least square (RLS).

According to the present disclosure, as a first stage, the projection approach may estimate a longitudinal and lateral position error of an object by projecting sensor information and a rotation angle error (a yaw angle error) between sensor-fused tracks.

For example, the rotation angle error may be calculated according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein, $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Additionally, the longitudinal and lateral position error may be calculated according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein $x_{err}$ is a lateral position error, $y_{err}$ is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Then, according to the present disclosure, as a second stage, sensor noise may be stochastically modeled and a model parameter may be estimated using recursive least square (RLS) for estimating a parameter based on the calculated errors.

Figure 2:
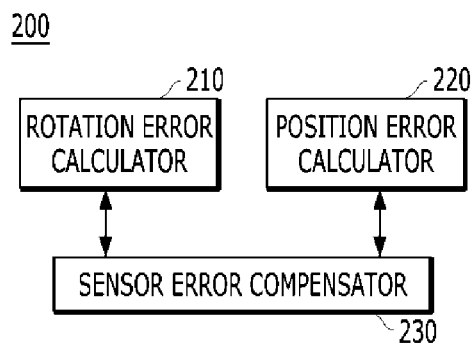
FIG. 2 is a block diagram for explaining a vehicle sensor error compensation apparatus according to an exemplary embodiment of the present disclosure.

FIG. 2 is a block diagram for explaining a vehicle sensor error compensation apparatus 200 according to the present disclosure. As shown in FIG. 2, the vehicle sensor error compensation apparatus 200 according to the present disclosure may include a rotation angle error calculator 210, a position error calculator 220, and a sensor error compensator 230.

In particular, the rotation angle error calculator 210 may be configured to calculate a rotation angle error between sensor object information and sensor fusion object information. The rotation angle error calculator 210 may be configured to calculate a rotation angle error between the sensor object information and the sensor fusion object information by projecting the sensor object information to the sensor fusion object information.

The rotation angle error calculator 210 may be configured to calculate the rotation angle error between the sensor object information and the sensor fusion object information according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein, $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Then, the position error calculator 220 may be configured to calculate the longitudinal and lateral position error between the sensor object information and the sensor fusion object information. When the error of the sensor object information is corrected, the position error calculator 220 may be configured to calculate the longitudinal and lateral position error between the corrected sensor object information and the sensor fusion object information.

The position error calculator 220 may be configured to calculate the longitudinal and lateral position error between the sensor object information and the sensor fusion object information according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein, $x_{err}$ is a lateral position error, $y_{err}$ n is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Then, when calculating the rotation angle error, the sensor error compensator 230 may be configured to correct an error of the sensor object information based on the rotation angle error, and correct a sensor error based on the longitudinal and lateral position error between the corrected sensor object information and the sensor fusion object information.

In particular, when an error of the sensor object information is corrected, if sensor object information and sensor fusion object information are acquired, the sensor error compensator 230 may be configured to operate the rotation angle error calculator 210 to calculate the rotation angle error between the sensor object information and the sensor fusion object information by projecting the sensor object information to the sensor fusion object information, and may be configured to correct an error of the sensor object information based on the rotation angle error upon calculating the rotation angle error. When acquiring the sensor object information and the sensor fusion object information, the sensor error compensator 230 may be configured to acquire sensor object information detected from one sensor with respect to the same target object and sensor fusion object information detected and fused from a plurality of sensors.

When operating the rotation angle error calculator 210, the sensor error compensator 230 may be configured to set the sensor fusion object information as reference information and may be configured to operate the rotation angle error calculator 210 to calculate the rotation angle error. For example, the rotation angle error may be a yaw angle error of a sensor be configured to sense the sensor object information.

Further, during compensation of a sensor error, when correcting an error of the sensor object information, the sensor error compensator 230 may be configured to operate the position error calculator 220 to calculate the longitudinal and lateral position error between the corrected sensor object information and the sensor fusion object information, and may be configured to compensate for the sensor error based on the position error and the rotation angle error upon calculating the position error. When operating the position error calculator 220, the sensor error compensator 230 may be configured to set sensor fusion object information as reference information and operate the position error calculator 220 to calculate the position error.

For example, the position error may be a longitudinal and lateral position error of a sensor be configured to sense the sensor object information. Accordingly, a sensor error may be compensated for based on the rotation angle error between the sensor object information and the sensor fusion object information and the longitudinal/lateral position error, and thus, performance for identifying the same object may be enhanced through real-time correction to match coordinates between heterogeneous sensors.

The present disclosure may overcome a phenomenon of coordinate mismatch that occurs in real time, and thus, enhancement in sensor fusion performance may be expected in an overall region. In other words, according to the present disclosure, coordinate may be corrected based on sensor information input every hour and sensor fusion information, and thus, a phenomenon of coordinate mismatch that occurs in real time may be overcome.

The present disclosure may advantageously reduce a computation time and enhance performance for estimating a parameter compared with the conventional art. In other words, according to the present disclosure, a parameter may be estimated using only the trigonometric function and the four fundamental arithmetic operations compared with the conventional art, and influence of sensor noise may be reduced without an additional algorithm.

According to the present disclosure, an embedded board may be mass-produced due to a short computation time and low calculation complexity. In other words, the conventional art requires use of an embedded board for enabling a floating point operation, while the present disclosure may be embodied by a fixed point operation. Therefore, according to the present disclosure, an embedded board with low computation performance compared with a computer may have an excellent effect in terms of computation performance compared with the conventional art.

Figure 3:
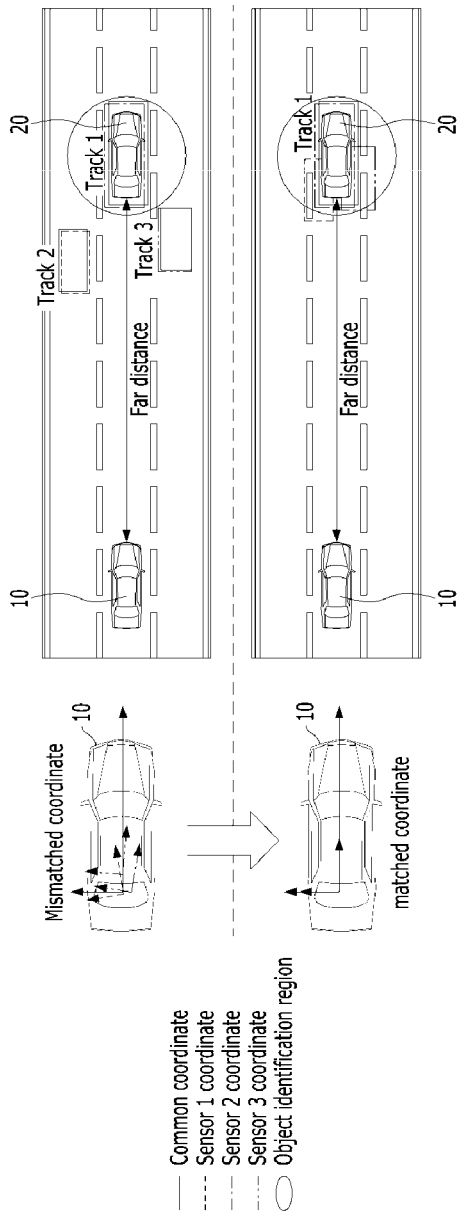
FIG. 3 is a diagram illustrating performance for identifying the same object through coordinate correction according to an exemplary embodiment of the present disclosure.

FIG. 3 is a diagram illustrating performance for identifying the same object through coordinate correction. As shown in FIG. 3, the present disclosure relates to a method of real-time correction of mismatch of coordinate based on a model for reducing computation complexity and a method of estimating a parameter and may overcome a problem in terms of degradation in performance for identifying the same object due to fine mismatch of coordinates of sensors.

In the subject vehicle 10, coordinates of heterogeneous sensors may be mismatched due to deformation of a sensor mount due to time or heat, a tough driving environment of a vehicle, or the like, or a tough driving environment of a vehicle. Such a phenomenon between coordinates of heterogeneous sensors may cause a position error of a surrounding target object 20. Accordingly, the position error of the target object 20 due to a phenomenon of mismatch of coordinates may also adversely affect performance for identifying the same object.

According to the present disclosure, a sensor position error may be compensated for through recursive least square (RLS) based on based on projection approach using two important factors that are sensor object information and sensor fused object information (which is used as reference information). Additionally, coordinates between heterogeneous sensors may be corrected to be matched and performance for identifying the same object may be enhanced by compensating for a sensor position. Thus, according to the present disclosure, a sensor position error model may be designed using only main factors that substantially affect object position information, thereby reducing model complexity.

According to the present disclosure, a model parameter may be estimated using only a trigonometric function and the four fundamental arithmetic operations, thereby achieving low computational load, low computational complexity, and a short computational time compared to the conventional art.

Figure 4:
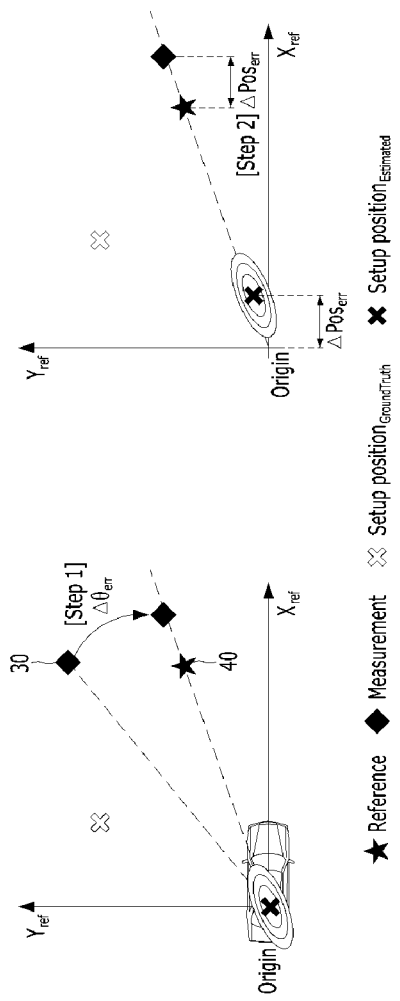
FIG. 4 is a diagram illustrating a procedure of compensating for an error of a vehicle sensor according to an exemplary embodiment of the present disclosure.

FIG. 4 is a diagram illustrating a procedure of compensating for an error of a vehicle sensor according to the present disclosure. The present disclosure may utilize a sensor position error model and a parameter estimator of the model. Particularly, the parameter of the sensor position error model may be derived using recursive least square (RLS) based on projection approach based on two types of information of sensor object information and sensor fusion object information (which is used as reference information).

In other words, the parameter of the sensor position error model may estimate senor information input every hour and sensor-fused track using projection approach and recursive least square (RLS). As shown in FIG. 4, according to the present disclosure, as a first stage, the projection approach may estimate a longitudinal and lateral position error of an object by projecting sensor information and a rotation angle error (e.g., a yaw angle error) between sensor-fused tracks.

For example, the rotation angle error may be calculated according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein, $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

The longitudinal and lateral position error may be calculated according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein $x_{err}$ is a lateral position error, $y_{err}$ is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Then, according to the present disclosure, as a second stage, sensor noise may be stochastically modeled and a model parameter may be estimated using recursive least square (RLS) for estimating a parameter, based on the calculated errors.

Figure 5:
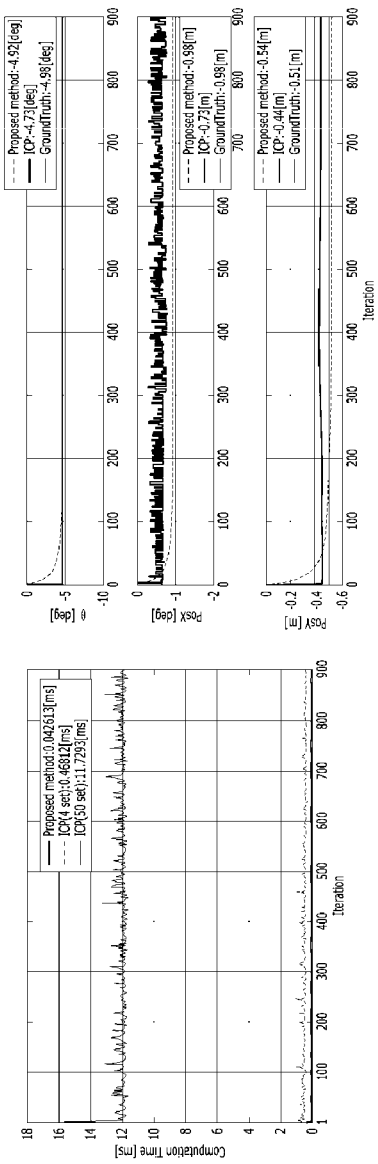
FIG. 5 is a diagram showing a computation time and enhancement in estimation performance according to an exemplary embodiment of the present disclosure.

FIG. 5 is a diagram showing a computation time and enhancement in estimation performance according to the present disclosure. FIG. 5 is a graph showing a comparison of a computation time and estimation performance between the present disclosure and the conventional art using an iterative closest point (ICP) method.

Particularly, an experiment target sensor may be a front radar device, a front camera (e.g., imaging device, video camera, or the like), or a front lidar. The front radar device may have about 0 to 190 m and a field of view (FoV) of about 20 degrees, the front camera may have about 0 to 80 m and a FoV of about 40 degrees, and the front lidar may have about 0 to 200 m and a FoV of about 110 degrees.

As seen from FIG. 5, according to the present disclosure, a computation speed of a maximum of about 99.7% is enhanced based on ICP that is a conventional method. According to the present disclosure, it may be seen that a similar value to ground truth based on ICP may be estimated and is robust to noise.

Figure 6:
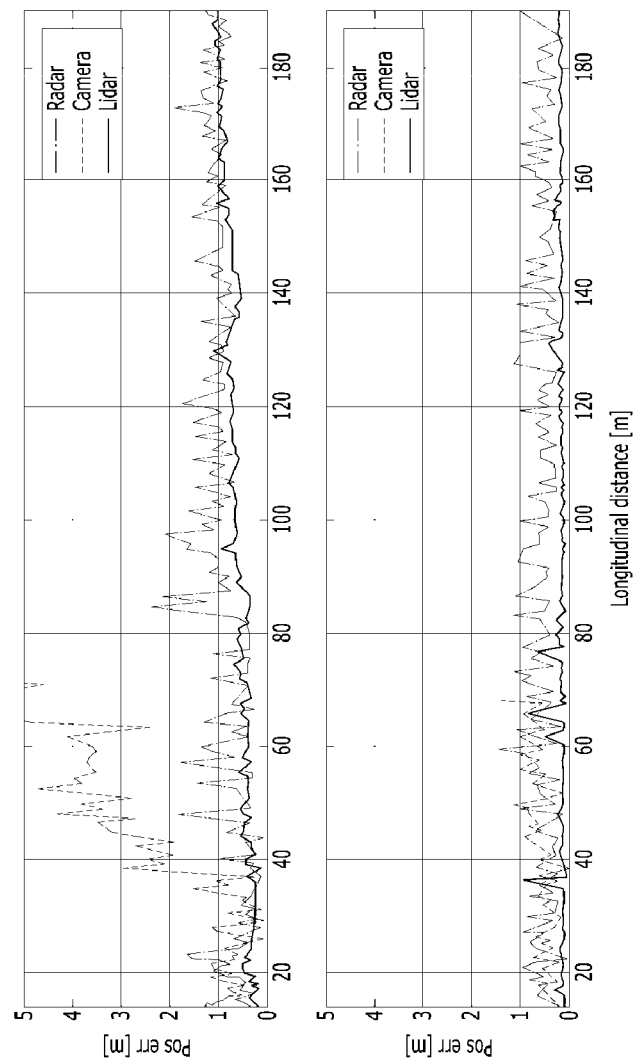
FIG. 6 is a diagram showing enhancement in a position error according to an exemplary embodiment of the present disclosure.

FIG. 6 is a diagram showing enhancement in a position error according to the present disclosure. FIG. 6 is a graph showing a comparison of position error performance between the case according to the present disclosure and the case in which the present disclosure is not used.

In particular, the reference position information may be object position information output from sensor fusion and the experiment target sensor may be a front radar device, a front camera, or a front lidar. The front radar device may have about 0 to 190 m and a FoV of about 20 degrees, the front camera may have about 0 to 80 m and a FoV of about 40 degrees FoV, and the front lidar may have about 0 to 200 m and a FoV of about 110 degrees.

As shown in FIG. 6, when the present disclosure is used, a position error is remarkably reduced compared with the case in which the present disclosure is not used. In other words, FIG. 6 shows that a position error is reduced within about 1 m at a detection distance of experiment target sensors.

Figure 7:
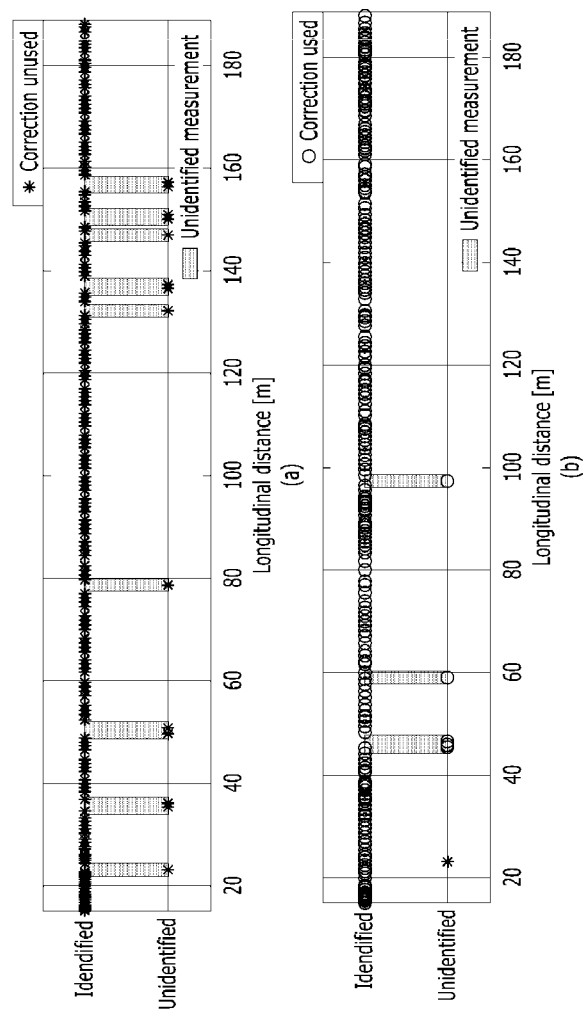
FIGS. 7 to 9 are diagrams showing enhancement in performance for identifying the same object according to an exemplary embodiment of the present disclosure.
Figure 8:
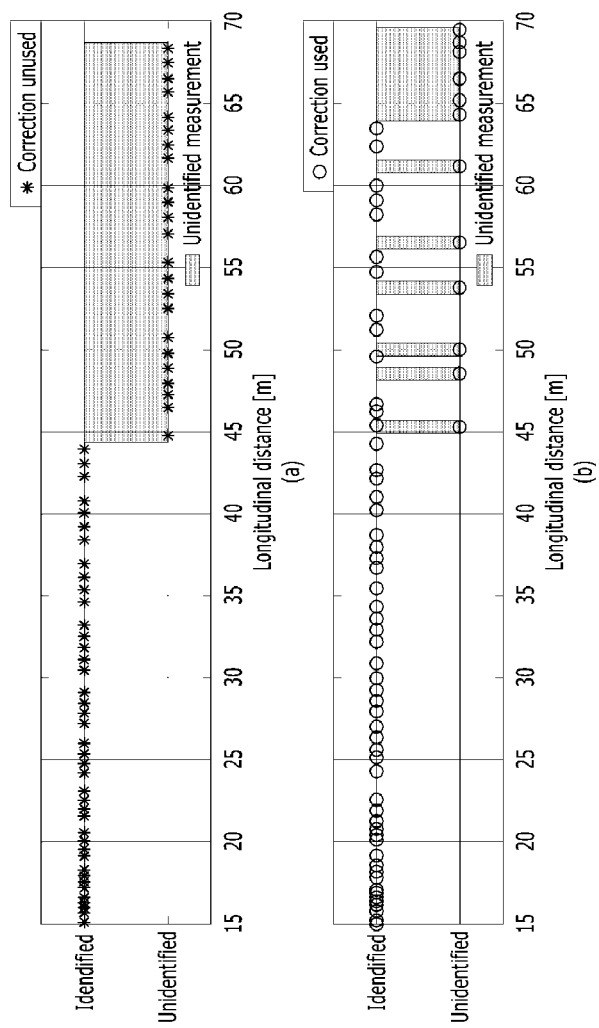
Figure 9:
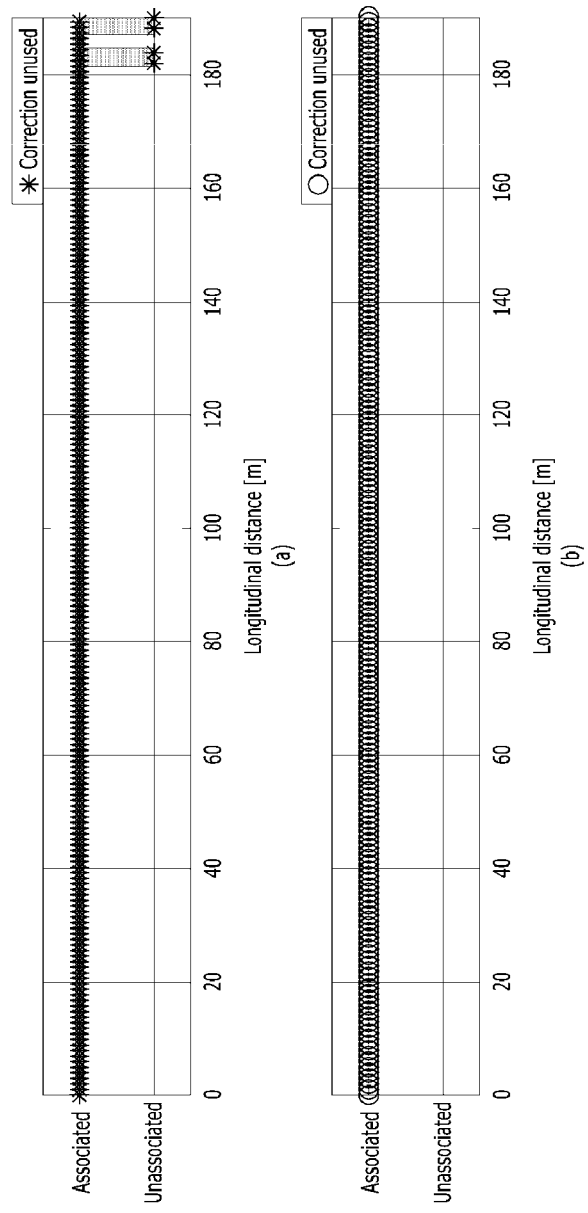

FIGS. 7 to 9 are diagrams showing enhancement in performance for identifying the same object according to the present disclosure. FIG. 7 shows an experimental result obtained via comparison of performance for identifying the same object of front radar object information between the case according to the present disclosure and the case in which the present disclosure is not used. Particularly, an evaluation factor may be obtained using the number of invalid measurement/total number of detections×100%.

As shown in FIG. 7, when the present disclosure is used, a ratio in which the same object is not identified by a front radar device is about 0.01%, but when the present disclosure is not used, a ratio in which the same object is not identified by the front radar device is about 7.72%. Accordingly, when the present disclosure is used, FIG. 7 shows that a ratio in which the same object is not identified is enhanced by about 99.8% compared with the case in which the present disclosure is not used.

FIG. 8 shows an experimental result obtained via comparison of performance for identifying the same object of front radar object information between the case according to the present disclosure and the case in which the present disclosure is not used. In particular, an evaluation facto may be obtained using the number of invalid measurement/total number of detections×100%.

As shown in FIG. 8, when the present disclosure is used, a ratio in which the same object is not identified by a front camera is about 21.5%, but when the present disclosure is not used, a ratio in which the same object is not identified by the front camera is about 43.75%. Accordingly, when the present disclosure is used, FIG. 8 shows that a ratio in which the same object is not identified is enhanced by about 49.14% compared with the case in which the present disclosure is not used.

FIG. 9 shows an experimental result obtained via comparison of performance for identifying the same object of front lidar object information between the case according to the present disclosure and the case in which the present disclosure is not used. In particular, an evaluation factor may be obtained using the number of invalid measurement/total number of detections×100%.

As shown in FIG. 9, when the present disclosure is used, a ratio in which the same object is not identified by a front lidar is about 0.0%, but when the present disclosure is not used, a ratio in which the same object is not identified by the front lidar is about 0.04%. Accordingly, when the present disclosure is used, it may be seen that a ratio in which the same object is not identified is enhanced by about 100% compared with the case in which the present disclosure is not used.

Figure 10:
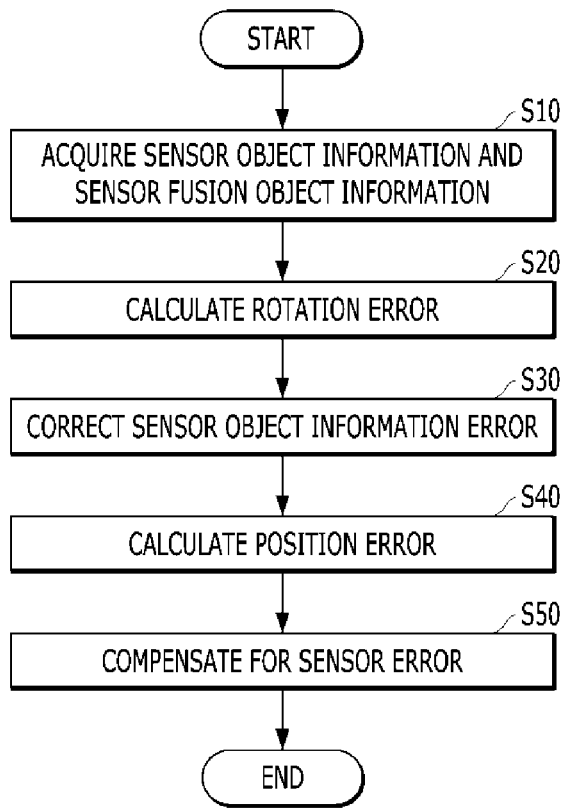
FIG. 10 is a flowchart illustrating a method of compensating for an error of a vehicle sensor according to an exemplary embodiment of the present disclosure.

FIG. 10 is a flowchart illustrating a method of compensating for an error of a vehicle sensor according to the present disclosure. Notably, the method described herein below may be executed by a controller specifically programmed to executed the process. As shown in FIG. 10, according to the present disclosure, sensor object information and sensor fusion object information may be acquired (S10). In particular, according to the present disclosure, sensor object information detected from one sensor and sensor fusion object information detected and fused from a plurality of sensors may be acquired with respect to the same target object.

Further, according to the present disclosure, the rotation angle error between the sensor object information and the sensor fusion object information may be calculated by projecting sensor fusion object information to sensor fusion object information (S20). In particular, according to the present disclosure, the sensor fusion object information may be set as reference information and the rotation angle error may be calculated.

For example, according to the present disclosure, a rotation angle error between sensor object information and sensor fusion object information may be calculated according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein, $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Then, according to the present disclosure, an error of the sensor object information may be corrected based on the calculated rotation angle error (S30). According to the present disclosure, a longitudinal and lateral position error between the corrected sensor object information and the sensor fusion object information may be calculated (S40).

In particular, the sensor fusion object information may be set as reference information and a position error may be calculated. For example, a longitudinal and lateral position error between sensor object information and the sensor fusion object information may be calculated according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein, $x_{err}$ is a lateral position error, $y_{err}$ is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

Further, a sensor error may be compensated for based on the position error and the rotation angle error (S50). Accordingly, according to the present disclosure, a sensor error may be compensated for based on the rotation angle error between the sensor object information and the sensor fusion object information and the longitudinal/lateral position error, and thus, performance for identifying the same object may be enhanced through real-time correction to match coordinates between heterogeneous sensors.

The present disclosure may overcome a phenomenon of coordinate mismatch that occurs in real time, and thus, enhancement in sensor fusion performance may be expected in an overall region. In other words, according to the present disclosure, coordinate may be corrected based on sensor information input every hour and sensor fusion information, and thus, a phenomenon of coordinate mismatch that occurs in real time may be overcome.

The present disclosure may advantageously reduce a computation time and enhance performance for estimating a parameter compared with the conventional art. In other words, a parameter may be estimated using only the trigonometric function and the four fundamental arithmetic operations compared with the conventional art, and influence of sensor noise may be reduced without an additional algorithm.

According to the present disclosure, an embedded board may be mass-produced due to a short computation time and low calculation complexity. In other words, the conventional art needs to use an embedded board for enabling a floating point operation, but the present disclosure may be embodied by a fixed point operation. Additionally, according to the present disclosure, an embedded board with low computation performance compared with a computer may have an excellent effect in terms of computation performance compared with the conventional art.

The present disclosure relates to a non-transitory computer-readable recording medium having recorded thereon a program for executing the method of compensating for an error of a vehicle sensor vehicle compensation apparatus and may perform procedures provided by the vehicle sensor error compensation method.

The apparatus and method for compensating for an error of a vehicle sensor related to at least one exemplary embodiment of the present disclosure as configured above may compensate for a sensor error based on a rotation angle error between sensor object information and sensor fusion object information and a longitudinal/lateral position error, and thus, performance for identifying the same object may be enhanced through real-time correction to match coordinates between heterogeneous sensors.

The present disclosure may overcome a phenomenon of coordinate mismatch that occurs in real time, and thus, enhancement in sensor fusion performance may be expected in an overall region. In other words, coordinate may be corrected based on sensor information input every hour and sensor fusion information, and thus, a phenomenon of coordinate mismatch that occurs in real time may be overcome.

The present disclosure may advantageously reduce a computation time and enhance performance for estimating a parameter compared with the conventional art. In other words, a parameter may be estimated using only the trigonometric function and the four fundamental arithmetic operations compared with the conventional art, and influence of sensor noise may be reduced without an additional algorithm.

According to the present disclosure, an embedded board may be mass-produced due to a short computation time and low calculation complexity. In other words, the conventional art requires the use of an embedded board for enabling a floating point operation, but the present disclosure may be embodied by a fixed point operation. Accordingly, according to the present disclosure, an embedded board with low computation performance compared with a computer may have an excellent effect in terms of computation performance compared with the conventional art.

It will be appreciated by persons skilled in the art that that the effects that could be achieved with the present disclosure are not limited to what has been particularly described hereinabove and other advantages of the present disclosure will be more clearly understood from the detailed description.

The disclosure may also be embodied as computer readable code on a non-transitory computer readable recording medium. The non-transitory computer readable recording medium is any data storage device that can store data which can thereafter be read by a computer system. Examples of the non-transitory computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A vehicle sensor error compensation apparatus, comprising:
a rotation angle error calculator configured to calculate a rotation angle error between sensor object information and sensor fusion object information;
a position error calculator configured to calculate a longitudinal and lateral position error between the sensor object information and the sensor fusion object information; and
a sensor error compensator configured to compensate for a sensor error based on the calculated rotation angle and position error,
wherein, in calculating the rotation angle error, the sensor error compensator is configured to correct an error of the sensor object information based on the rotation angle error, and compensate for the sensor error based on the longitudinal and lateral position error between the corrected sensor object information and the sensor fusion object information.

2. The apparatus of claim 1, wherein the rotation angle error calculator is configured to calculate a rotation angle error between the sensor object information and the sensor fusion object information by projecting the sensor object information to the sensor fusion object information.

3. The apparatus of claim 1, wherein the rotation angle error calculator is configured to calculate a rotation angle error between the sensor object information and the sensor fusion object information according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein $\theta_{err}$ is a rotation angle error, $x_{meas}$ is a lateral position value for sensor object information, y meas is a longitudinal position value for sensor object information, $x_{ref}$ is a lateral position value for sensor fusion object information, and $y_{ref}$ is a longitudinal position value for sensor fusion object information.

4. The apparatus of claim 1, wherein, in correcting an error of the sensor object information, the position error calculator is configured to calculate the longitudinal and lateral position error between the corrected sensor object information and the sensor fusion object information.

5. The apparatus of claim 1, wherein the position error calculator is configured to calculate the longitudinal and lateral position error between the sensor object information and the sensor fusion object information according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein $x_{err}$ is a lateral position error, $y_{err}$ is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

6. The apparatus of claim 1, wherein, in correcting an error of the sensor object information, the sensor error compensator is configured to:
operate the rotation angle error calculator to calculate the rotation angle error between the sensor object information and the sensor fusion object information by projecting the sensor object information to the sensor fusion object information in response to acquiring the sensor object information and the sensor fusion object information; and
correct an error of the sensor object information based on the rotation angle error upon calculating the rotation angle error.

7. The apparatus of claim 6, wherein, in acquiring the sensor object information and the sensor fusion object information, the sensor error compensator is configured to acquire sensor object information detected from one sensor with respect to the same target object and sensor fusion object information detected and fused from a plurality of sensors.

8. The apparatus of claim 6, wherein, in operating the rotation angle error calculator, the sensor error compensator is configured to set the sensor fusion object information as reference information and operate the rotation angle error calculator to calculate the rotation angle error.

9. The apparatus of claim 6, wherein the rotation angle error is a yaw angle error of a sensor for sensing the sensor object information.

10. The apparatus of claim 1, wherein, in compensating for the sensor error, the sensor error compensator is configured to:
operate the position error calculator to calculate a longitudinal and lateral position error between the corrected sensor object information and the sensor fusion object information in response to correcting an error of the sensor object information; and
compensate for the sensor error based on the position error and the rotation angle error in response to calculating the position error.

11. The apparatus of claim 10, wherein, in operating the position error calculator, the sensor error compensator is configured to the sensor fusion object information as reference information and operate the position error calculator to calculate the position error.

12. The apparatus of claim 10, wherein the position error is a longitudinal and lateral position error of a sensor for sensing the sensor object information.

13. A method of compensating for an error of a vehicle sensor of a vehicle sensor error compensation apparatus, comprising:
acquiring, by a controller, sensor object information and sensor fusion object information;
calculating, by the controller, a rotation angle error between the sensor object information and the sensor fusion object information by projecting the sensor object information to the sensor fusion object information;
correcting, by the controller, an error of the sensor object information based on the calculated rotation angle error;
calculating, by the controller, a longitudinal and lateral position error between the corrected sensor object information and the sensor fusion object information; and
compensating, by the controller, for the sensor error based on the position error and the rotation angle error.

14. The method of claim 13, wherein the acquiring the sensor object information and the sensor fusion object information includes:
acquiring, by the controller, sensor object information detected from one sensor with respect to the same target object and sensor fusion object information detected and fused from a plurality of sensors.

15. The method of claim 13, wherein the calculating the rotation angle error includes:
setting, by the controller, the sensor fusion object information as reference information and calculating the rotation angle error.

16. The method of claim 13, wherein the calculating the rotation angle error includes:
calculating, by the controller, a rotation angle error between the sensor object information and the sensor fusion object information according to Equation:

$$\theta_{err} = \tan^{-1}\left(\frac{y_{meas}}{x_{meas}}\right) - \tan^{-1}\left(\frac{y_{ref}}{x_{ref}}\right)$$

wherein $\theta_{err}$ is a rotation angle error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

17. The method of claim 13, wherein the calculating the longitudinal and lateral position error includes:
setting, by the controller, the sensor fusion object information as reference information and calculating the position error.

18. The method of claim 13, wherein the calculating the longitudinal and lateral position error includes:
calculating, by the controller, the longitudinal and lateral position error between the sensor object information and the sensor fusion object information according to Equation:

$$\begin{bmatrix} x_{err} \\ y_{err} \end{bmatrix} = \begin{bmatrix} x_{ref} \\ y_{ref} \end{bmatrix} + \begin{bmatrix} \cos\theta_{err} & -\sin\theta_{err} \\ \sin\theta_{err} & \cos\theta_{err} \end{bmatrix} \begin{bmatrix} x_{meas} \\ y_{meas} \end{bmatrix}$$

wherein $x_{err}$ is a lateral position error, $y_e$n is a longitudinal position error, $x_{meas}$ is a lateral position value for sensor object information, $y_{meas}$ is a longitudinal position value for sensor object information, $x_{ref}$ is a lateral position value for sensor fusion object information, and $y_{ref}$ is a longitudinal position value for sensor fusion object information.

19. A non-transitory computer-readable recording medium having recorded thereon a program for executing the method of claim 13.

20. A vehicle, comprising:
- a sensing apparatus configured to sense sensor object information and sensor fusion object information on a target object; and
- a vehicle sensor error compensation apparatus configured to compensate for a sensor error based on the sensor object information and the sensor fusion object information,
- wherein the vehicle sensor error compensation apparatus includes:
  - a rotation angle error calculator configured to calculate a rotation angle error between sensor object information and sensor fusion object information;
  - a position error calculator configured to calculate a longitudinal and lateral position error between the sensor object information and the sensor fusion object information; and
  - a sensor error compensator configured to correct an error of the sensor object information based on the rotation angle error, and compensate for the sensor error based on the longitudinal and lateral position error between the corrected sensor object information and the sensor fusion object information.

* * * * *